Feb. 24, 1959 D. M. COBILE 2,874,505
COMBINED BOAT AND FISHING NET
Filed Aug. 2, 1957 3 Sheets-Sheet 1
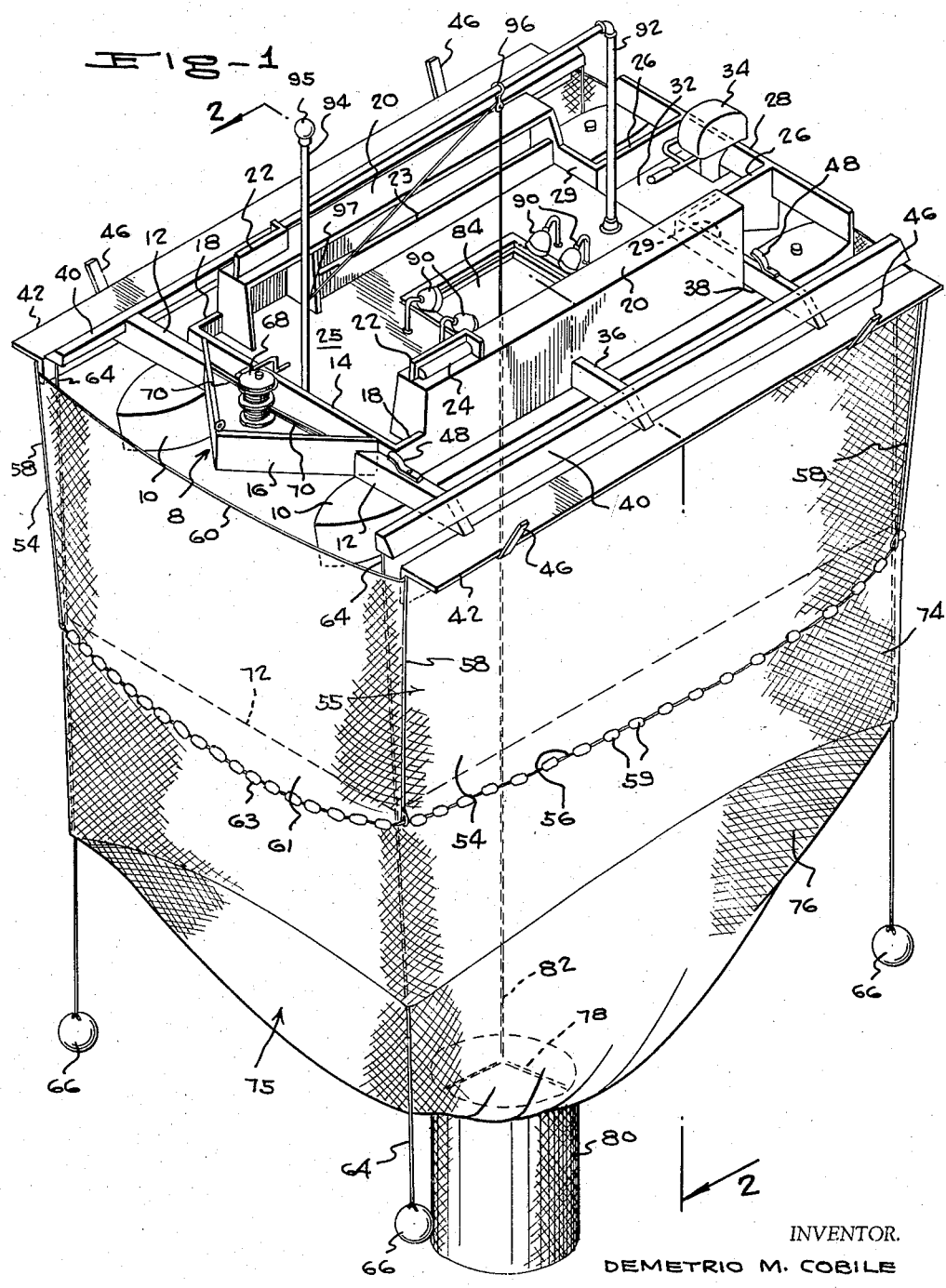
INVENTOR.
DEMETRIO M. COBILE
BY
McMorrow, Berman + Davidson
ATTORNEYS

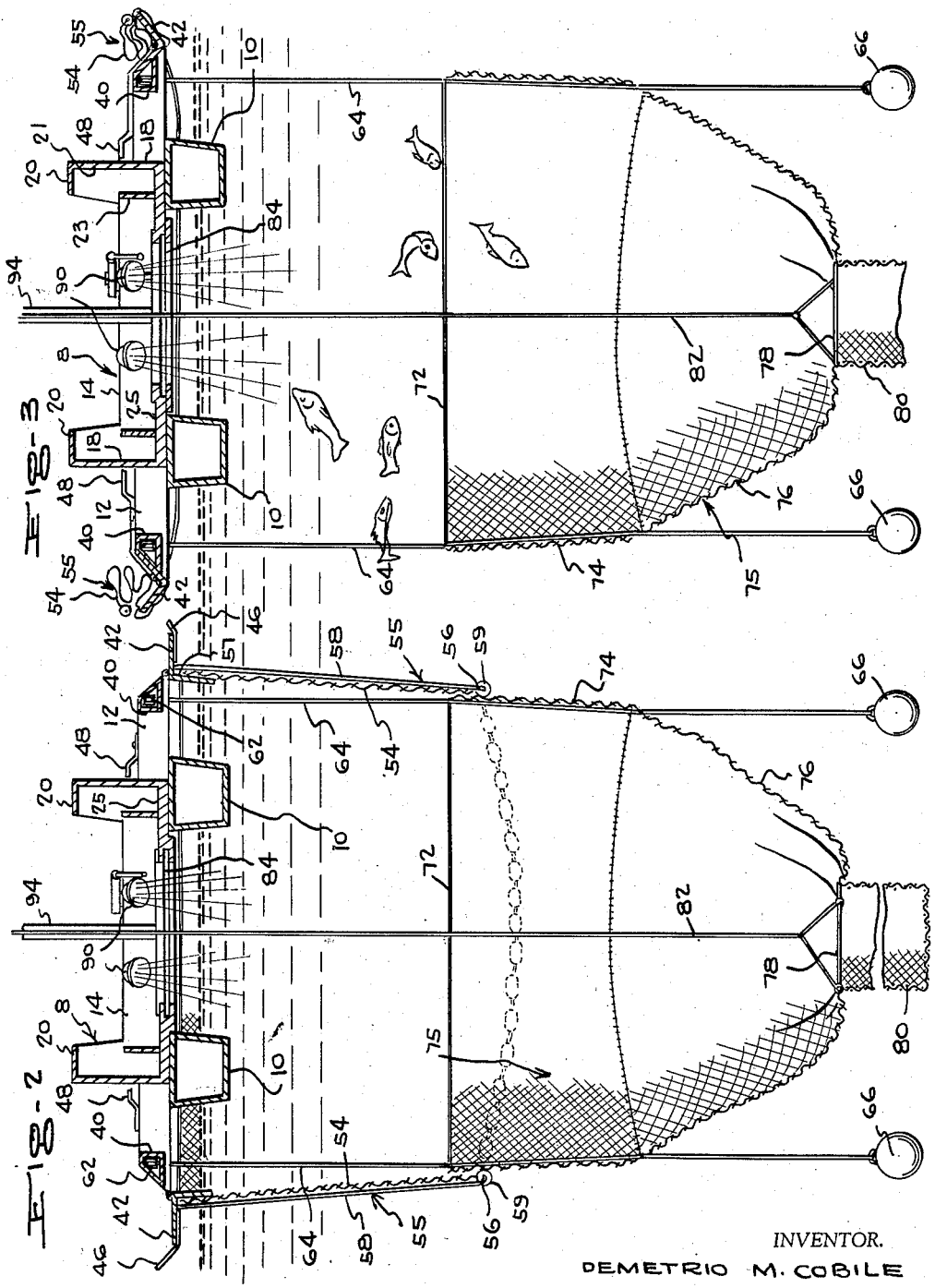

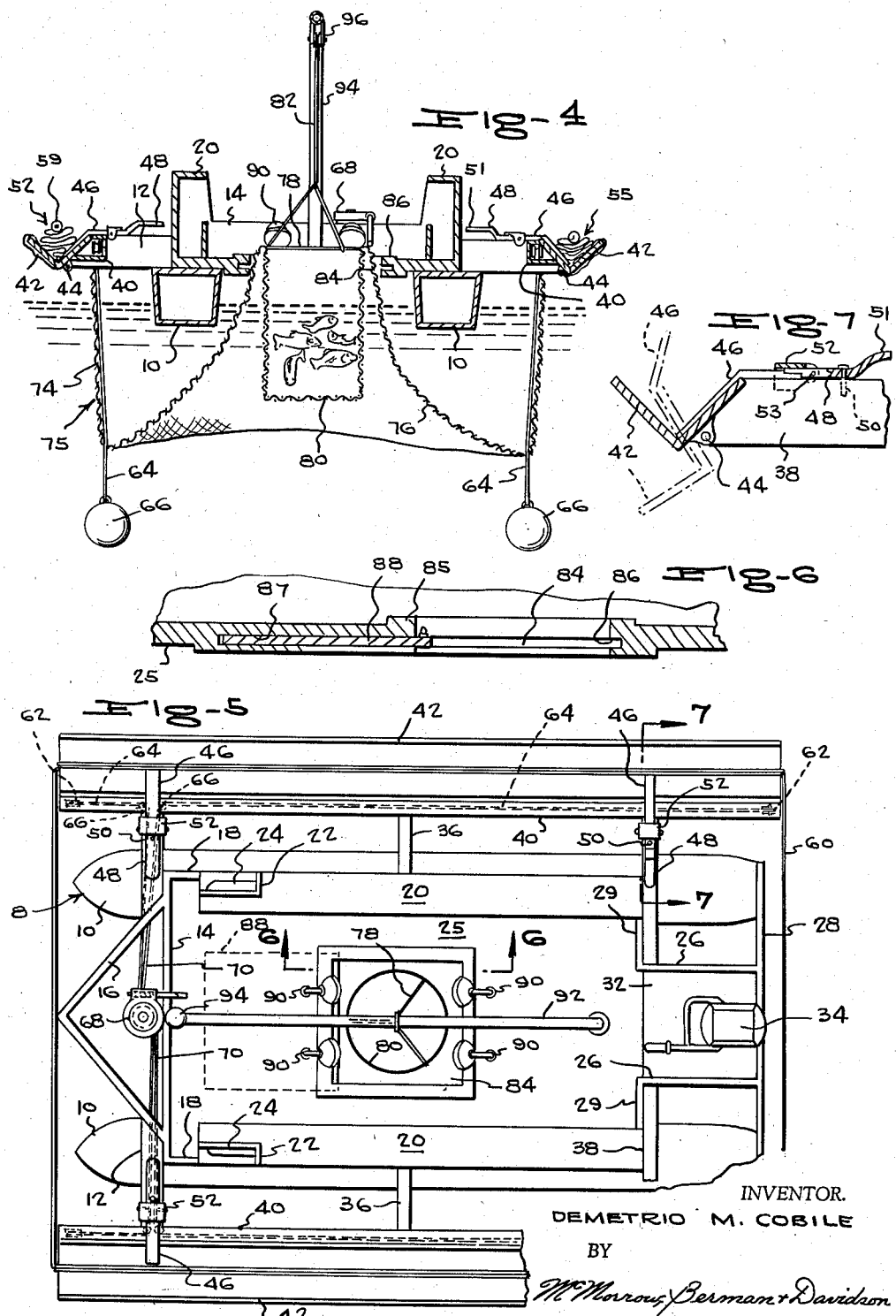

United States Patent Office 2,874,505
Patented Feb. 24, 1959

2,874,505

COMBINED BOAT AND FISHING NET

Demetrio M. Cobile, Honolulu, Territory of Hawaii

Application August 2, 1957, Serial No. 675,994

8 Claims. (Cl. 43—7)

This invention relates generally to fishing operations of the type carried on on a comparatively large scale, through the use of large nets, haul seines, or the like.

Most usually, nets or seines of the character described are drawn behind a conventional boat, or alternatively, seines may be left at a particular location, to be hauled in at a selected time.

One important object of the present invention is to provide a vessel which will in actuality constitute a frame for the upper portion of a large seine or net, which net will extend peripherally of the vessel itself, and will be adapted to be lowered or raised, with fish trapped in the net being caused to concentrate at the location of a center well in the vessel, so that it can be removed through said well.

Another object is to provide, in a combined boat and net of the character described, a trap in association with a sectionally constituted net, which trap will be in vertical alignment with the well, and will be so designed that all fish caught in the net will be directed into the trap, with the trap being thereafter raised directly through the well for removal of the fish.

Another object is to provide, in a combination boat and net of the type stated, means whereby the net will be swiftly and easily raised or lowered into a fish-confining position, with the net extending about an area in which strong light beams will be played downwardly through the well, whereby the fish will be attracted to the light and will thus be disposed in the area in which they will be confined within the net when the net is lowered.

Another object is to provide a vessel of the character described, that will be so formed that the trapped fish cannot be damaged or destroyed by large marauding fish because of an arrangement in which the fish that are confined within the net will be permitted to escape into a wire trap, which trap will be resistant to sharks and other fish that might otherwise tend to reduce or completely destroy the catch.

Another object is to provide a combination vessel of the character described which will include a flat, buoyant, generally rectangular platform on which the workers and passengers of the vessel may be supported, with said platform being provided with means extending along opposite sides thereof for lowering an upper section of the net, thus to permit said upper section of the net to be lowered between the platform and a lower net section, for the purpose of confining the fish.

Another object is to provide a combination boat and fishing net, which can be motor-powered, so that in effect a large net, including a supporting frame, can be used for supporting the fisherman, and can be self-propelled to any location desired, for use in fishing operations.

Other objects will appear from the following description, the claims appended thereto, and from the annexed drawing, in which like reference characters designate like parts throughout the several views, and wherein:

Figure 1 is a perspective view of a combination boat and fishing net according to the invention;

Figure 2 is a vertical sectional view on line 2—2 of Figure 1;

Figure 3 is a vertical sectional view identical to Figure 2, in which the upper net section has been raised from a lowered position;

Figure 4 is a view on the same cutting plane as Figures 2 and 3, showing the net and trap fully raised for removal of the fish and for propulsion of the vessel to another location;

Figure 5 is a top plan view of the combination vessel and net, portions being broken away;

Figure 6 is an enlarged, detail sectional view through the well, on line 6—6 of Figure 5; and Figure 7 is an enlarged, detail sectional view substantially on line 7—7 of Figure 5.

Referring to the drawings in detail, the combination vessel includes a buoyant platform or net frame assembly generally designated at 8 in the several figures of the drawing, this assembly constituting the part of the vessel that is disposed at the surface, and that is adapted to support the fishermen.

The assembly 8 is horizontal, and is generally rectangular in outer configuration, as will be noted from Figures 1 and 5. To make the same buoyant, any of various means may be employed, but in the illustrated example, I have preferred to use a pair of laterally spaced, parallel, elongated pontoons or floats 10. These are completely hollow, and are hermetically sealed, and have tapering bow ends as shown in Figure 1 and also in Figure 5.

The floats 10, adjacent their bow ends, are in underlying relation to a transverse member or cross beam 12 (Figure 1) the opposite ends of which project laterally outwardly beyond the respective floats. The floats are fixedly secured to the cross beam 12, and the cross beam in turn is fixedly secured to a platform frame that includes a raised front end wall 14, and forwardly convergent brace elements 16, which serve to break up the waves and facilitate the forward movement of the vessel through the water. The cross beam 12 is interrupted by the forwardly convergent bow or peak defined by the members 16.

Fixedly secured to the opposite ends of and extending rearwardly from the front wall 14 are side walls 18, that are extended longitudinally of the respective floats, intermediate the width of the floats as shown in Figures 1 and 5. The walls 18, as shown in Figures 2 and 3, may be higher than the member 14, and at their top edges are integral with inwardly projecting flanges or overhangs 20, so that storage spaces 21 are defined in the platform assembly, which spaces can receive various items of tackle. Within the spaces there are provided walls 23, extending in parallel relation to the side walls 18, laterally inwardly from said side walls 18 as shown in Figure 3. Compartments 22 are provided at opposite sides of the platform, adjacent the front member 14 as shown in Figure 5, for the usual red and green navigation lights 24, said compartments being disposed upon the top walls or flanges 20.

A flat, rectangular deck 25 is bounded by the upwardly projecting front and side walls 14, 18 respectively, and at its rear end, the deck terminates at rear end walls 29, disposed laterally outwardly from opposite sides of the longitudinal center line of the deck, so as to define a space the opposite sides of which are bounded by longitudinally arranged extensions 26 of the rear walls 29. The extensions 26 are fixedly secured at their rear ends to a rear cross beam 28, the ends of which overlie and are secured to the trailing ends of the floats 10.

The deck is provided with a rear extension 32, disposed between the wall extensions 26, and at its back end, the extension 32 is recessed to receive a conventional outboard motor 34, which of course would be provided with the usual clamps and similar means for mounting the same in position upon the transom or rear cross piece 28.

Although the platform assembly described above it thought to be novel and efficient construction, well suited for the purpose of the present invention, it is to be understood that said assembly is merely the presently preferred embodiment of the invention. Quite possibly, the assembly might be varied in configuration and in construction, and of course, many details have been described above which are matters of design and of fitting the platform out for nautical use.

In any event, the main feature of the invention, as so far described, resides in the provision of a flat, buoyant platform, which is adapted to support a selected number of workers, and which is designed to self-propel, if desired.

Middle cross beams 36 are fixedly secured to and project laterally outwardly from opposite sides of the platform, as shown in Figures 1 and 5, and are adapted to further reinforce the construction as well as to provide means cooperating with the front and rear cross beams in receiving supports for an upper net section. The rear walls 29 are extended laterally outwardly as at 38, and the several cross beams are beveled or sloped at their outer ends, for a purpose to be made apparent.

Referring now to Figures 1–4, mounted upon the sloped or beveled outer ends of the several cross beams are longitudinal cable housings 40, extending the full length of and disposed laterally outwardly from opposite sides of the platform. Outwardly from the cable housing, net throughs 42, of L-shaped or right angular cross section (Figure 7) are pivotally connected at 44, at the juncture of the angularly related portions of the trough, to the outer extremities of the several cross beams. The troughs swing between the full and dotted line positions shown in Figure 7, and when in their full line positions, open upwardly so as to confine therein the side walls or portions of an upper net section. The inner wall of each trough is in contact, in these circumstances, with the beveled surface of the cross means, as shown in Figure 7.

The trough may be pivoted through slightly less than 90°, to the dotted line position, so as to now open laterally outwardly so that the confined net portions will now slide off the outer part of the trough, into the water.

To hold the troughs in their normal, upwardly opening positions, there are provided latch assemblies on the front and rear beams 12, 38. These include arms 48 fulcrumed intermediate their ends upon the beams for swinging movement about vertical axes, said arms having swinging movement on the pivot pins 50 thereof between normal positions aligned with the respective cross beams, and trough-releasing positions in which the arms are angular to the lengths of the cross beams. The arms at their inner ends have upwardly offset parts providing handles 51, and the opposite ends of the arms are recessed to interengage with correspondingly recessed inner extremities of angular latch members 46 (Figures 1 and 7) fixedly secured to the trough in positions such that the projecting parts of the members 46 will be disposed horizontally and will extend laterally inwardly from the trough when the troughs are in their upwardly opening, full line positions of Figure 7. To prevent the latches from accidentally swinging from their latching positions, there are provided keepers 52 formed as downwardly opening channels, pivoted at 53 upon the latch arms, and adapted to swing forwardly into positions embracing the interengaging ends of the latch arms and projections 46. Said keepers, by embracing the projections, prevent the latch arms, to which the keepers are pivoted, from swinging laterally out of latching position. The keepers further extend downwardly over the cross beams, so as to still further strengthen the locking action.

The upper section of a large net, which net extends peripherally about the platform assembly, has been generally designated 55. Said upper section includes side portions 44 that are disposed in the troughs when not in use as clearly shown in Figure 3. The side portions or walls 54, when the trough is swung to its Figure 2 position, fall out of the trough, and hang straight downwardly therefrom at opposite sides of the vessel, it being understood that said side portions 54 of the upper net section 55 will be secured along one edge to the trough as at 57.

Referring to Figure 1, the free edges of the net portions 54 are depending from the outwardly swung troughs, include lines 56 provided at closely spaced intervals with small weights 59. The lines 56 at their opposite ends are connected to lines 58, which extend along the front and rear ends of the net portions 54. It will thus be understood that when the lines 58 are pulled upwardly, the net portions 54 will be raised from their Figure 2 to their Figure 3 positions, after which then can be completely confined within the troughs and the troughs swung back from their Figure 2 to their Figure 3 positions, thus to keep the portions 54 available, at opposite sides of the boat, ready to be dropped instantly whenever desired.

The upper net section also includes end portions 61 (Figure 1) which are in actuality continuations of the mesh bodies of the side portions 54 and extend across the front and rear ends of the vessel. The lines 56 along the bottom edges of portions 54 are continued across the bottom edges of the portions 61, as shown at 63.

Thus, when the lines 58 are pulled on, not only will portions 54 be raised, but also, the portions 61 will be raised.

Extending along the top edges of the portions 61 are binding cables or ropes 60 extending across the front and rear ends, respectively, of the platform.

Within the housings 40 there are provided pulleys 62 (Figures 2 and 5), at opposite ends of their respective housing. Cables 64 are trained about the pulleys.

The cables 64 are trained within housing 40 about closely spaced, direction-changing pulleys 66, and said direction-changing pulleys are aligned transversely of the platform with a winch 68 disposed in the tapered bow 16. The cables are extended about the pulleys 66 and then are extended inwardly as at 70 to be wound upon the drum of the winch, so that when the winch is operated in one direction, the several cables 64 are pulled upwardly at the several corners of the platform, with said cables being lowered responsive to rotation of the winch drum in an opposite direction.

At their lower ends (see Figure 1) the cables 64 are connected to weights 66.

The cables 64 are connected, intermediate their ends, to horizontal connecting cables 72 arranged in a rectangular series and providing bindings for the upper edges of the walls 74 of a lower net section generally designated 75.

The lower net section 75 includes a downwardly tapering lower or bottom portion 76 (Figures 1 and 2), having an opening at its center bounded by a circular metal rim 78 provided upon the upper end of a cylindrical trap 80 the lower end of which is closed, said trap being formed of a stout wire mesh material. Connected to the rim is a lifting cable 82, extending vertically upwardly in centered position within the net, through a rectangular, centrally disposed well 84 formed in deck 25. The well has a coaming 85, in the inner surface of which is formed guide slots 86, said guide slots at one side of the coaming being in communication with a deep recess 87 in which is slidably engaged a hatch cover 88, adapted to be moved from its open position of Figure 6 to a closed position. The hatch will be left in closed position during movement of the boat from place to place.

Spaced about the hatch are spotlights 90, arranged to cast their beams downwardly through the hatch so that the area beneath the platform will be strongly illuminated.

A hoist frame 92 of inverted U-shape is provided at its leading end with an upwardly projecting extension 94 on which may be mounted a white light 95. The hoist frame overlies the well, and a pulley 96 is suspended from the center of the frame, with the cable 82 being trained about the pulley. The cable, after being trained about the pulley, can extend laterally downwardly to be normally anchored to a hook or equivalent means 97 carried by the platform assembly.

In use of the device, the parts will normally appear as in Figure 4 when the boat is moving from place to place. The upper section will be raised with the side portions thereof disposed in troughs 42. The lower net section 75 will also be raised directly against the underside of the platform assembly, and in particular the bottom wall 76 of the lower section will be pulled upwardly as shown in Figure 4, by reason of the fact that the edge of the center opening of the bottom 76 is connected to the trap 80, and the trap 80 when the boat is moving from place to place, is pulled upwardly so as to extend partially through the well 84.

When it is desired to net fish, the boat is stopped, and may be anchored if desired. The trap 80 is lowered, and the bottom 76 will belly downwardly in the lowered position of the trap as shown in Figures 1-3.

Then, the lower net section 75 is lowered by means of the winch, to the Figure 3 position. The upper edge of the lower section is spaced a substantial distance downwardly from the platform, so that the fish may swim freely into the area above the lower net section. The fish will be attracted by the strong light 90 that plays downwardly through the well, it being well known that the fish are attracted to light in this manner.

When a sufficient number of fish have been attracted to the area below the platform, the upper net section is dropped from its Figure 3 to its Figure 2 position, and at its lower edge will extend about the upper edge portion of the lower net section. As a result, the fish will be fully enclosed.

As a next step, one need merely raise the lower net section to its Figure 4 position, while the upper net section remains lowered. The lower section will thus telescope within the upper section until the top edge of the lower section is at or above the water level. Now, the cable 82 is pulled upwardly so as to raise the trap and the trap is now raised to its Figure 4 position. All the fish thus ultimately will swim into the trap, and can be removed through the well.

The trap has the further desirable function of preventing destruction of the trapped fish by sharks or the like. While sharks are known to rip ordinary netting such as that used in the net sections, they cannot penetrate the wire material of the basket or trap 80 and thus the fish can escape into the trap 80.

It will be apparent that the combination boat and fish net is designed to trap a large quantity of fish in a comparatively short time. The entire net is self-propelled, and is adapted for supporting a number of workers. Thus, in effect, the structure is both a boat and a self-contained fishing net, since the platform forms the top of the net or seine, and being buoyant and adapted to hold workers, can be self-propelled, or towed, whichever is desired.

It is believed clear that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. Fishing apparatus comprising a buoyant platform structure having a central well; an upper net section suspended from the periphery of the structure; a lower net section suspended from the periphery of said structure independently of the upper net section; and means on the structure for telescoping the lower net section upwardly within the upper net section for removal, through the well, of fish confined within said lower net section.

2. Fishing appartus comprising a bouyant platform structure having a central well; an upper net section suspended from the periphery of the structure and including a pair of collapsible side portions; troughs on opposite sides of the platform structure in which said side portions may be stored; a lower net section suspended from the periphery of said structure independently of the upper net section; and winch means on the structure for telescoping the lower net section upwardly within the upper net section for removal, through the well, of fish confined within said lower net section.

3. Fishing apparatus comprising a buoyant platform structure having a central well; an upper net section suspended from the periphery of the structure and including a pair of collapsible side portions; troughs of angular cross section pivotally mounted on opposite sides of the platform structure, said side portions being connected to and being adapted for storage within said trough, said troughs swinging between normal, upwardly opening positions in which the side portions are stored in the trough and laterally opening positions in which the side portions may gravitate from the troughs to be suspended below the platform structure; a lower net section suspended from the periphery of said structure independently of the upper section; and winch means on the structure for telescoping the lower section upwardly within the upper section for removal, through the well, of fish confined within said lower net section.

4. Fishing apparatus comprising a buoyant platform structure having a central well; an upper net section suspended from the periphery of the structure and collapsible to a storage condition in which said section extends about the periphery of the platform structure substantially in the plane of said structure; and a lower net section suspended from the periphery of said structure independently of the upper section, said lower section being movable between opposite extreme positions in one of which it is fully telescoped within the upper section in engagement with the underside of the platform about the well, for removal, through the well, of fish confined within the lower section, and in the other of which it is spaced downwardly from the platform structure and projects a substantial distance below the upper section, whereby to provide an open space into which fish may move when the upper section is collapsed with the lower section in its second named position.

5. Fishing apparatus comprising a buoyant platform structure having a central well; an upper net section suspended from the periphery of the structure and collapsible to a storage condition in which said section extends about the periphery of the platform structure substantially in the plane of said structure; and a lower net section suspended from the periphery of said structure independently of the upper section, said lower section being movable between opposite extreme positions in one of which it is fully telescoped within the upper section in engagement with the underside of the platform about the well, for removal, through the well, of fish confined within the lower section, and in the other of which it is spaced downwardly from the platform structure and projects a substantial distance below the upper section, whereby to provide an open space into which fish may move when the upper section is collapsed with the lower section in its second named position, said lower section including a bottom wall, and a trap projecting downwardly from the bottom wall and proportioned to be drawn upwardly through the well.

6. Fishing apparatus comprising a buoyant platform structure having a central well; an upper net section suspended from the periphery of the structure and collapsible to a storage condition in which said section extends about the periphery of the platform structure substantially in the plane of said structure; and a lower net section suspended from the periphery of said structure independently of the upper section, said lower section being movable between opposite extreme positions in one of which it is fully telescoped within the upper section in engagement with the underside of the platform about the well, for removal, through the well, of fish confined within the lower section, and in the other of which it is spaced downwardly from the platform structure and projects a substantial distance below the upper section, whereby to provide an open space into which fish may move when the upper section is collapsed with the lower section in its second named position, said lower section including a bottom wall, and a trap projecting downwardly from the bottom wall and proportioned to be drawn upwardly through the well, said trap being of a rigidly constituted mesh material.

7. Fishing apparatus comprising a buoyant platform structure having a central well; an upper net section suspended from the periphery of the structure and collapsible to a storage condition in which said section extends about the periphery of the platform structure substantially in the plane of said structure; a lower net section suspended from the periphery of said structure independently of the upper section, said lower section being movable between opposite extreme positions in one of which it is fully telescoped within the upper section in engagement with the underside of the platform about the well, for removal, through the well, of fish confined within the lower section, and in the other of which it is spaced downwardly from the platform structure and projects a substantial distance below the upper section, whereby to provide an open space into which fish may move when the upper section is collapsed with the lower section in its second named position; and light means mounted on the platform structure about the well and arranged to cast its beams downwardly through the well for attracting fish to the underside of the platform.

8. Fishing apparatus comprising a buoyant platform structure having a central well; an upper net section suspended from the periphery of the structure and collapsible to a storage condition in which said section extends about the periphery of the platform structure substantially in the plane of said structure; and a lower net section suspended from the periphery of said structure independently of the upper section, said lower section being movable between opposite extreme positions in one of which it is fully telescoped within the upper section in engagement with the underside of the platform about the well, for removal, through the well, of fish confined within the lower section, and in the other of which it is spaced downwardly from the platform structure and projects a substantial distance below the upper section, whereby to provide an open space into which fish may move when the upper section is collapsed with the lower section in its second named position, said lower section including a bottom wall, and a trap projecting downwardly from the bottom wall and proportioned to be drawn upwardly through the well, said lower net section including a cable extending centrally upwardly of the same through the well, said cable being connected directly to the trap for drawing the trap upwardly through the well.

References Cited in the file of this patent
UNITED STATES PATENTS

| | | |
|---|---|---|
| 292,123 | Lindsay | Jan. 15, 1885 |
| 586,863 | Nelson | July 20, 1897 |
| 2,030,793 | Horn | Feb. 11, 1936 |
| 2,713,229 | Duffy | Jan. 18, 1955 |